United States Patent
Spaulding et al.

(10) Patent No.: US 10,417,435 B2
(45) Date of Patent: Sep. 17, 2019

(54) REPLACING A TOKEN WITH A MASK VALUE FOR DISPLAY AT AN INTERFACE

(71) Applicant: Oracle International Corporation, Redwood Shores, CA (US)

(72) Inventors: Kent Arthur Spaulding, Portland, OR (US); Kenneth Joseph Meltsner, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 182 days.

(21) Appl. No.: 15/354,174

(22) Filed: Nov. 17, 2016

(65) Prior Publication Data

US 2017/0155655 A1    Jun. 1, 2017

Related U.S. Application Data

(60) Provisional application No. 62/261,533, filed on Dec. 1, 2015.

(51) Int. Cl.
| | |
|---|---|
| *G06F 21/62* | (2013.01) |
| *H04L 29/06* | (2006.01) |
| *H04L 9/32* | (2006.01) |
| *H04L 29/08* | (2006.01) |

(52) U.S. Cl.
CPC ............ *G06F 21/62* (2013.01); *H04L 9/3226* (2013.01); *H04L 63/107* (2013.01); *H04L 67/10* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 7,940,929 | B1 * | 5/2011 | Sengupta | G06F 21/6272 380/51 |
| 8,458,487 | B1 * | 6/2013 | Palgon | G06F 21/00 380/277 |
| 9,306,939 | B2 | 4/2016 | Chan et al. | |
| 9,313,195 | B2 | 4/2016 | Mattsson et al. | |
| 9,465,954 | B1 * | 10/2016 | Speedie | G06F 21/6227 |
| 9,639,569 | B2 | 5/2017 | Mattsson et al. | |
| 9,699,149 | B2 | 7/2017 | Mattsson et al. | |
| 9,813,401 | B2 | 11/2017 | Malatesha et al. | |
| 9,965,648 | B1 * | 5/2018 | Cheng | G06F 21/6245 |
| 10,049,227 | B1 * | 8/2018 | Sampson | G06F 21/6218 |
| 2004/0139043 | A1 * | 7/2004 | Lei | G06F 21/6227 |

(Continued)

*Primary Examiner* — Benjamin E Lanier
(74) *Attorney, Agent, or Firm* — Invoke

(57) ABSTRACT

Techniques for replacing a token with a mask value are disclosed. In an embodiment, a masking engine is implemented by a cloud application. The cloud application receives, from a client device, a request for a data value associated with a data field. The masking engine determines that a set of data stored in association with the data field corresponds to a token format. The cloud application transmits a mask value, rather than the set of data, towards the client device. In an embodiment, a masking engine is implemented by a client device and/or a data residency proxy. The masking engine receives a set of data for display at an interface of the client device. The masking engine determines that the set of data corresponds to a token format. The masking engine causes a mask value, rather than the set of data, to be displayed at the interface.

20 Claims, 8 Drawing Sheets

(56) References Cited

U.S. PATENT DOCUMENTS

| | | | |
|---|---|---|---|
| 2004/0199596 A1* | 10/2004 | Nutkis | G06F 21/6245 709/207 |
| 2009/0048997 A1* | 2/2009 | Manickam | G06F 21/62 706/47 |
| 2009/0235199 A1* | 9/2009 | Mastie | G06F 21/6245 715/781 |
| 2010/0199356 A1* | 8/2010 | Krishnamurthy | G06F 21/6254 726/26 |
| 2011/0113050 A1* | 5/2011 | Youn | G06F 21/6218 707/757 |
| 2011/0209053 A1* | 8/2011 | Stronger | G06F 21/6227 715/255 |
| 2012/0005169 A1* | 1/2012 | Saxena | G06F 21/6227 707/687 |
| 2012/0047097 A1* | 2/2012 | Sengupta | G06F 21/60 706/12 |
| 2012/0047552 A1* | 2/2012 | Sengupta | G06F 21/60 726/1 |
| 2012/0047553 A1* | 2/2012 | Stronger | G06F 21/60 726/1 |
| 2012/0259877 A1* | 10/2012 | Raghunathan | G06F 21/6254 707/757 |
| 2014/0047551 A1* | 2/2014 | Nagasundaram | G06F 21/60 726/26 |
| 2014/0201844 A1* | 7/2014 | Buck | G06F 21/50 726/26 |
| 2015/0007249 A1* | 1/2015 | Bezzi | G06F 21/6254 726/1 |
| 2015/0082449 A1* | 3/2015 | Mushkatblat | G06F 21/6254 726/26 |
| 2015/0113659 A1* | 4/2015 | D'Costa | G06F 21/60 726/26 |
| 2016/0132696 A1* | 5/2016 | Vidhani | G06F 21/6245 726/28 |
| 2016/0246979 A1* | 8/2016 | Rakshit | G06F 21/6218 |
| 2017/0068828 A1* | 3/2017 | Nishi | G06F 21/6254 |
| 2017/0098093 A1* | 4/2017 | Koo | G06F 21/6209 |

* cited by examiner

REPLACING A TOKEN WITH A MASK VALUE FOR DISPLAY AT AN INTERFACE

BENEFIT CLAIMS; INCORPORATION BY REFERENCE

This application claims the benefit of U.S. Provisional Patent Application 62/261,533, filed Dec. 1, 2015, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to interfaces. In particular, the present disclosure relates to replacing a token with a mask value for display at an interface.

BACKGROUND

Entities utilizing cloud applications face the challenge of complying with data residency laws and/or requirements. A data residency law restricts certain data, such as personal information, from being transmitted outside of a particular authorized jurisdiction. An authorized jurisdiction may be, for example, a particular organization and/or a particular country. Meanwhile, cloud applications that process such restricted data may utilize hardware that resides outside of the authorized jurisdiction.

Data residency proxies (DRPs) may be used to prevent restricted data from being transmitted outside of an authorized jurisdiction. A client device within an authorized jurisdiction obtains a particular set of restricted data. The client device transmits the restricted data towards a cloud application. A DRP intercepts the transmission and replaces the restricted data with one or more tokens. The DRP transmits the tokens, rather than the restricted data, to the cloud application for processing and/or storage. A token serves as a temporary replacement value for the original value of the restricted data. A token may be, for example, an arbitrary set of characteristics and/or an encrypted value of the original value of the restricted data.

DRPs ensure that client devices within an authorized jurisdiction receive the original value of the restricted data, while client devices outside of the authorized jurisdiction do not receive the original value of the restricted data. A client device within an authorized jurisdiction transmits a request for a particular set of restricted data from a cloud application. The cloud application transmits a token, corresponding to the restricted data, to a DRP. Responsive to determining that the client device is within the authorized jurisdiction, the DRP maps the token to the original value of the restricted data. The DRP transmits the original value of the restricted data to the client device. The client device may display the original value of the restricted data at an interface. Meanwhile, a client device outside of the authorized jurisdiction transmits a request for a particular set of restricted data from the cloud application. The cloud application transmits a token, corresponding to the restricted data, to the client device. The transmission may but is not necessarily intercepted by a DRP. If the DRP intercepts the transmission, the DRP does not map the token to the original value of the restricted data. The client device, which is outside of the authorized jurisdiction, receives the token, rather than the original value of the restricted data. The client device may display the token at an interface.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
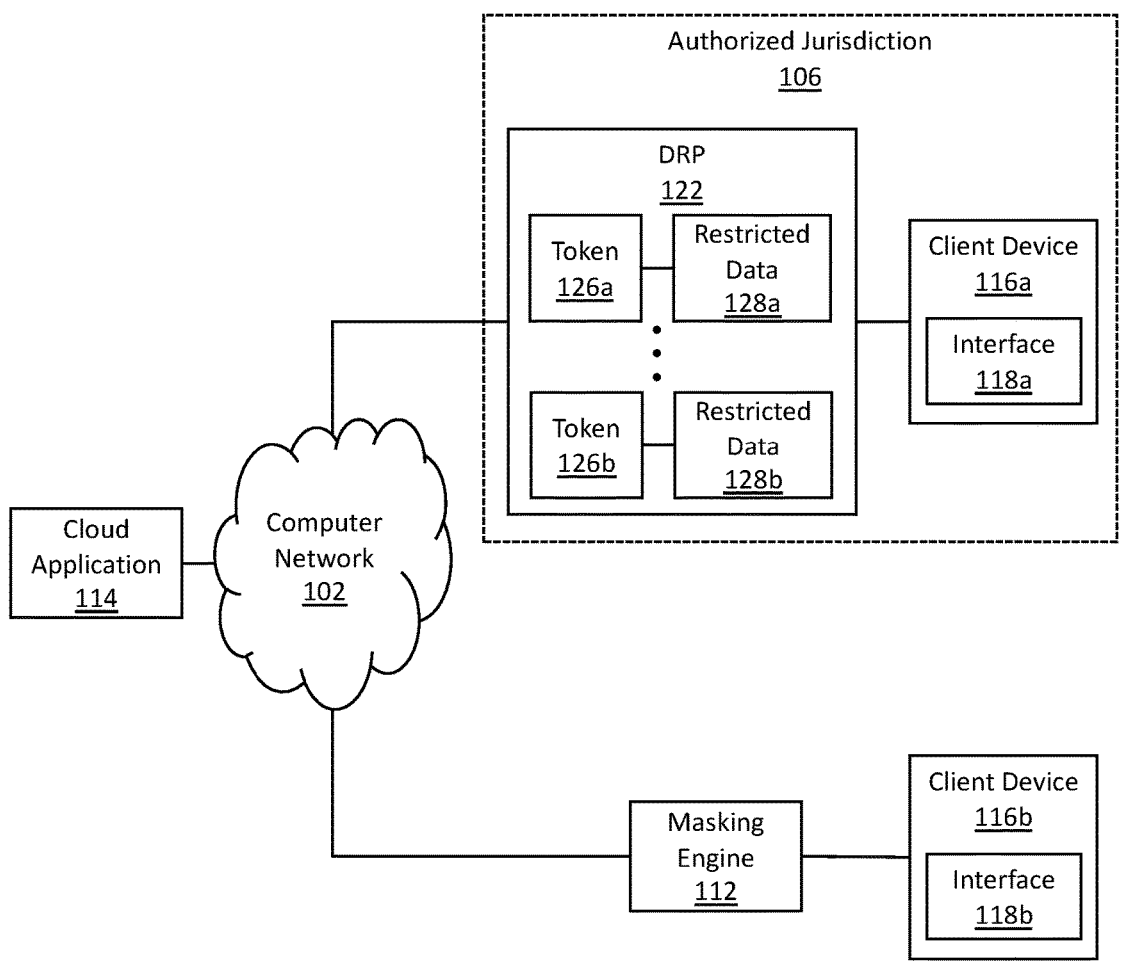
FIG. 1 illustrates client devices utilizing a cloud application in conjunction with a data residency proxy (DRP) and/or a masking engine, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. MASKING SYSTEM ARCHITECTURE
3. REPLACING A TOKEN WITH A MASK VALUE BY A MASKING ENGINE THAT IS NOT IMPLEMENTED BY A CLOUD APPLICATION
4. REPLACING A TOKEN WITH A MASK VALUE BY A MASKING ENGINE THAT IS IMPLEMENTED BY A CLOUD APPLICATION
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

One or more embodiments include masking a token, which is returned by a cloud application in response to a request for restricted data. A client device transmits a request for restricted data to a cloud application. The cloud application transmits a response including a token, which serves as a placeholder for the restricted data. Prior to the response being received and/or displayed by the client device, a masking engine intercepts the response. The masking engine analyzes the format of the data within the response. Based on the format of the data, the masking engine identifies the token within the response. Various methods may be implemented to identify the token based on the format of the data, as further described below. The masking engine replaces the token with a mask value. The client device displays the mask value rather than the token.

One or more embodiments include masking a token, by a masking engine implemented by a cloud application, in response to a request for restricted data. A client device transmits a request for restricted data to a cloud application. The masking engine, implemented by the cloud application, identifies a set of data to be included in a response to the request. The masking engine analyzes the format of the set of data. Based on the format of the set of data, the masking engine identifies a token within the set of data. Various methods may be implemented to identify the token based on the format of the data, as further described below. Responsive to determining that the client device is not associated with a permission for receiving the restricted data, the masking engine replaces the token with a mask value. The client device displays the mask value rather than the token.

One or more embodiments include identifying a token, within a set of data to be displayed by a client device, based on the format of the set of data. A masking engine may use various methods for analyzing the format of the set of data. In an embodiment, the masking engine identifies one or more formats that are designated for use by tokens (referred to herein as "token formats"). The masking engine determines that the set of data corresponds to a token format. The masking engine determines that the set of data includes a token. In another embodiment, the masking engine identifies one or more formats that are acceptable for display by the client device. The masking engine determines that the set of data does not correspond to any of the acceptable display formats. The masking engine determines that the set of data includes a token. After identifying the token using any of the various methods, the masking engine may replace the token with a mask value.

One or more embodiments described in this Specification and/or recited in the claims may not be included in this General Overview section.

2. Masking System Architecture

FIG. 1 illustrates client devices utilizing a cloud application in conjunction with a data residency proxy (DRP) and/or a masking engine, in accordance with one or more embodiments. FIG. 1 includes a cloud application 114, a computer network 102, client devices 116a-b, a data residency proxy (DRP) 122, a masking engine 112, and an authorized jurisdiction 106. More or fewer components may be connected to and/or associated with the computer network 102. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a computer network 102 provides connectivity among a set of nodes. The nodes may be local to and/or remote from each other. The nodes are connected by a set of links. Examples of links include a coaxial cable, an unshielded twisted cable, a copper cable, an optical fiber, and a virtual link. The computer network 102 may be, for example, the Internet, a wide-area network, and/or a local-area network. As illustrated, the computer network 102 provides connectivity between a cloud application 114 and client devices 116a-b. Additional embodiments and/or examples relating to computer networks are described below in Section 6, titled "Computer Networks and Cloud Networks."

In one or more embodiments, a cloud application 114 is an application, operating system, platform, and/or other network resource that executes on a cloud network. Utilizing the cloud network, the cloud application 114 is shared amongst multiple client devices 116a-b. As an example, a cloud network may execute a single instance of a cloud application 114, which is shared amongst multiple client devices. As another example, a cloud network may execute multiple instances of a cloud application 114, each of which is designated for a particular group of client devices. Client devices 116a-b request computing services from a cloud network independently of each other. Network resources are dynamically assigned to the requests and/or clients on an on-demand basis. Additional embodiments and/or examples relating to cloud networks are described below in Section 6, titled "Computer Networks and Cloud Networks."

In an embodiment, a cloud application 114 provides one or more services to an end user of client devices 116a-b. As an example, a cloud application may be a database application storing personal information of citizens of a particular country. As another example, a cloud application may provide functionality for users to complete and submit tax forms to a government entity. The cloud application 114 may be written in one or more programming languages, such as Java, C, C++, Pascal, BASIC, FORTRAN, COBOL, LISP, and/or assembly.

In one or more embodiments, a client device (such as client devices 116a-b) is a device that executes a client process. A client process is a process that makes a request for computing services and/or network resources provided by a computer network, such as a cloud network. Client devices 116a-b may request computing services from the cloud application 114. As an example, client device 116a may request that the cloud application 114 process and/or store a set of data. As part of the request, client device 116a may transmit the set of data to the cloud application 114. Client device 116a, which transmits the set of data to the cloud application 114, may be referred to as an "originating client device." Meanwhile, client device 116b may request that the cloud application 114 retrieve and return the set of data to client device 116b. Client device 116b, which requests the set of data from the cloud application 114, may be referred to as a "retrieving client device."

Each client device is associated with an interface (such as interfaces 118a-b). An interface refers to hardware and/or software configured to facilitate communications between a user and the associated client device. An interface includes user interface elements. A user interface element may be configured to receive user input. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, an interface (and/or a user interface element thereof) is limited to displaying certain forms of data. As an example, an interface may include a text field of a specified width and height. The text field may be limited to displaying a certain number, type, and/or size of characters. If a data set to be displayed in the text field is not within the limitations associated with the text field, then the display of the interface may cause errors. The text field may become distorted. The text field may be displayed with dimensions that are different than the specified width and height. Other user interface elements surrounding the text field may become displaced.

In an embodiment, an interface (and/or a user interface element thereof) specifies operations to be performed on a data set prior to being displayed using a user interface element. The operations are invalid on certain forms of data. As an example, an interface may include field for displaying the initials of a person. The interface may obtain a data set including a first name and a last name of the person. The interface may specify operations for extracting and concatenating the first letter of the first name and the first letter of the last name. The operations may be invalid for certain forms of data. If the data set included characters in foreign languages, for example, then execution of the operations may generate errors. The interface may generate errors and/or be rendered incorrectly.

In one or more embodiments, an authorized jurisdiction 106 is a geographical location, physical location, organization, and/or other delimited scope within which restricted data is permitted to reside. Restricted data may be referred to as "residing" within a particular location if the restricted data is stored at a physical server and/or data storage device that is located within the particular location. Additionally or alternatively, restricted data may be referred to as "residing" within a particular organization if the restricted data is stored at a physical server and/or data storage device that is managed by the particular organization. A government, organization, and/or other entity enacts laws and/or policies to govern data residing within a particular authorized jurisdiction 106. The laws and/or policies define what information qualifies as "restricted data." Restricted data may include, for example, personal information (such as name, age, and residential address), personally identifiable information (such as social security number, and driver license number), financial information, and/or health information. The laws and/or policies prohibit such restricted data from being transmitted outside of the authorized jurisdiction 106.

In one or more embodiments, a data residency proxy (DRP) 122 refers to hardware and/or software configured to prevent restricted data from being transmitted outside of an authorized jurisdiction 106. A DRP 122 intercepts the transmission of outbound data from an authorized jurisdiction 106. The DRP 122 identifies any restricted data within the outbound data and replaces the restricted data with a token. The DRP 122 transmits the token rather than the restricted data outside of the authorized jurisdiction 106.

The DRP 122 maintains a set of mappings between tokens 126a-b and restricted data 128a-b. A mapping between a particular token and a particular set of restricted data indicates that the particular token serves as a temporary replacement value for the particular set of restricted data. The particular token serves as a placeholder for the particular set of restricted data while the restricted data is being processed and/or stored outside of an authorized jurisdiction 106. As illustrated, for example, token 126a may be a temporary replacement value for restricted data 128a. Token 126b may be a temporary replacement value for restricted data 128b. Further descriptions relating to tokens are included below with reference to FIG. 2.

In response to a request for restricted data from a client device 116a within an authorized jurisdiction 106, the DRP 122 is configured to provide the original value of the restricted data to the client device 116a. The DRP 122 intercepts the transmission of inbound data into an authorized jurisdiction 106. The DRP 122 identifies any tokens within the inbound data. Based on the mappings between tokens 126a-b and tokens 128a-b, the DRP 122 identifies the original value of the restricted data corresponding to a particular token within the inbound data. The DRP 122 replaces the token with the original value of the restricted data. The DRP 122 transmits the original value of the restricted data to the client device 116a within the authorized jurisdiction 106.

In response to a request for restricted data from a client device 116b located outside of an authorized jurisdiction 106, the DRP 122 does not provide the original value of the restricted data to the client device 116b. The DRP 122 may but does not necessarily intercept the transmission of a token from the cloud application 114 to the client device 116b. If the DRP does intercept the transmission, the DRP 122 does not map the token to the original value of the restricted data. The DRP 122 transmits the token to the client device 116b. If the DRP does not intercept the transmission, the client device 116b receives the token directly from the cloud application 114.

In one or more embodiments, a masking engine 112 refers to hardware and/or software configured to perform operations described herein for replacing a token with a mask value for display at an interface. Further descriptions relating to a masking engine 112 are included below with reference to FIG. 2.

Figure 2:
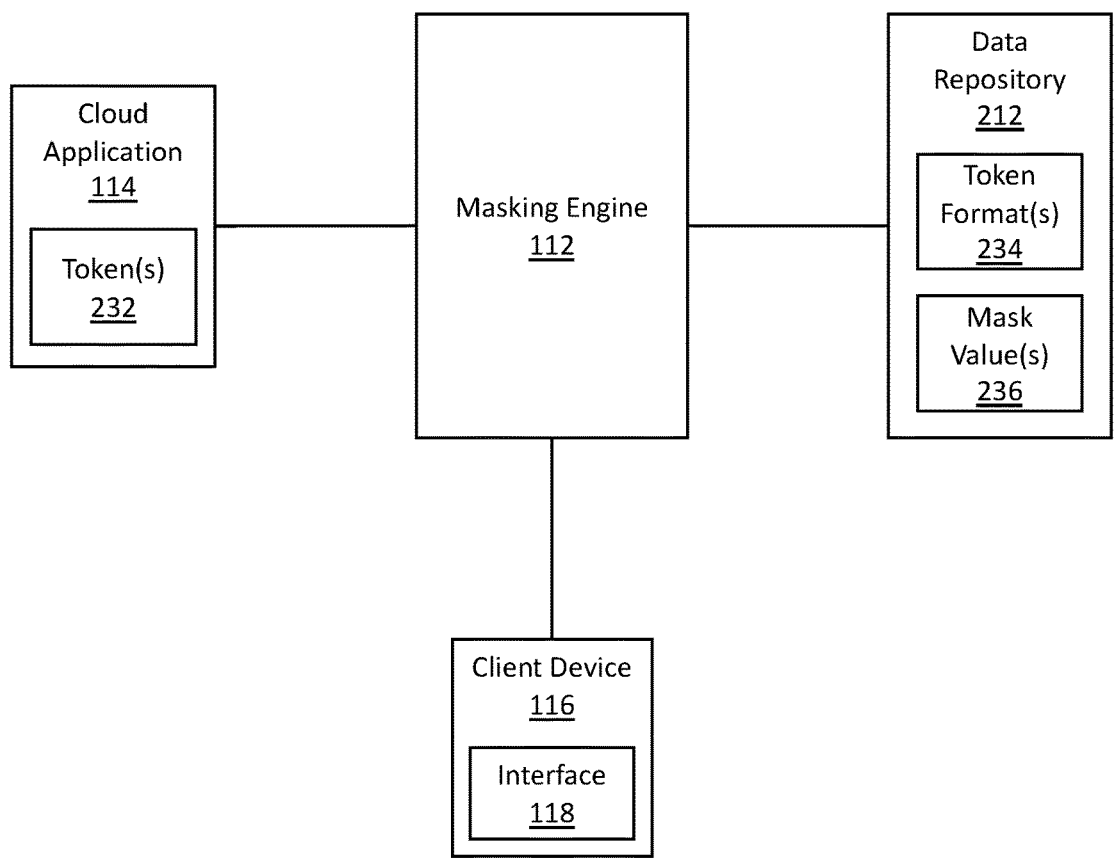
FIG. 2 illustrates a masking system, in accordance with one or more embodiments.

FIG. 2 illustrates a masking system, in accordance with one or more embodiments. As illustrated in FIG. 2, a masking system 200 includes a masking engine 112, a data repository 212, a cloud application 114, and a client device 116. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

As described above, a client device 116 is a device that requests computing services from a cloud application 114. The client device 116 is associated with an interface 118. The client device 116 may be a "retrieving client device" that requests a set of data from the cloud application 114. The client device 116 may request access to restricted data from the cloud application 114. The client device 116 may be unaware that the cloud application 114 stores tokens in place of the restricted data. The client device 116 may be outside of an authorized jurisdiction for the restricted data.

As described above, a cloud application 114 is an application, operating system, platform, and/or other network resource that executes on a cloud network. The cloud application 114 is implemented on devices and/or machines that are outside of an authorized jurisdiction. The cloud application 114 stores and/or processes tokens 232 rather than restricted data.

As described above, a token 232 serves as a temporary replacement value for a particular set of restricted data. A token 232 serves as a placeholder for a particular set of restricted data while the restricted data is being processed and/or stored outside of an authorized jurisdiction. Each token 232 is a unique value generated by a DRP to replace a particular set of restricted data. A token 232 may be an arbitrary set of characters of arbitrary length and/or an encrypted value of the original value of the restricted data. A token may include characters of one or more foreign languages and/or characters with no particular meaning.

In an embodiment, a token is associated with a data type. The data type associated with a token is the data type corresponding to the restricted data that was replaced by the token. A data type is a classification of data based on (a) the value of the data, (b) the operations that may be performed on the data, (c) the meaning of the data, and/or (d) the ways in which the data may be used. Examples of data types include text, number, and date. As an example, a data set may include a name "John Smith." A data type of the data set may be text. A token replacing "John Smith" may be associated with a textual data type. As another example, a data type of a telephone number "650-888-1234" may be number. A token replacing "650-888-1234" may be associated with a numeric data type. As another example, a data type of a birthday "10/15/1980" may be date. A token replacing "10/15/1980" may be associated with a date data type.

In one or more embodiments, a data repository 212 is any type of storage unit and/or device (e.g., a file system, database, collection of tables, or any other storage mechanism) for storing data. Further, a data repository 212 may include multiple different storage units and/or devices. The multiple different storage units and/or devices may or may not be of the same type or located at the same physical site. Further, a data repository 212 may be implemented or may execute on the same computing system as a masking engine 112. Alternatively or additionally, a data repository 104 may be implemented or executed on a computing system separate from a masking engine 112. A data repository 212 may be communicatively coupled to a masking engine 112 via a direct connection or via a network.

Information describing one or more token formats 234 and one or more mask values 236 may be implemented across any of components within the system 200. However, this information is illustrated within the data repository 212 for purposes of clarity and explanation.

In one or more embodiments, a token format 234 refers to a particular format associated with tokens 232. A token format 234 is a particular arrangement, structure, layout, style, form, shape, and/or size of the characters of a token. As an example, a token format may require a particular set of characters at the beginning of all tokens. The particular set of characters may serve as a prefix in all tokens. As another example, a token format may require a particular set of characters at the end of all tokens. The particular set of characters may serve as a suffix in all tokens. As another example, a token format may require a particular spacing between the characters of all tokens. All tokens may include, for example, one space after the first five characters of the token and two spaces after the first ten characters of the token.

In an embodiment, a particular token format 234 is associated with a set of tokens sharing a common attribute. Different token formats 234 are used for tokens associated with different attributes. Tokens generated by different DRPs may comply with different token formats 234. Additionally or alternatively, tokens generated for restricted data associated with different authorized jurisdictions may comply with different token formats 234. Additionally or alternatively, tokens associated with different data types may comply with different token formats 234.

As an example, a particular token format may govern tokens replacing restricted data generated within Canada. The token format may require that the third character of tokens associated with Canada be "C." Another token format may govern tokens replacing restricted data generated within Europe. The token format may require that the third character of tokens associated with Europe be "E."

As another example, a token format may require that tokens associated with a numeric data type begin with the characters, "123." Another token format may require that tokens associated with a textual data type begin with the characters, "abc."

In addition to or in lieu of token formats 234, a data repository 212 may store information describing one or more acceptable display formats. An acceptable display format is a format of data that may be properly displayed by an interface 118. Additionally or alternatively, an acceptable display format is a format of data that may be properly displayed by a particular user interface element of an interface 118.

As an example, an interface may be configured to display information in English. Acceptable display formats for the interface may include: (a) any letters ranging from "A" to "Z"; and (b) any digits ranging from "0" to "9."

As another example, a user interface element may be configured to display a telephone number. Acceptable display formats for the user interface element may include: (a) three digits, followed by a dash, followed by three digits, followed by a dash, followed by four digits; and (b) one digit, followed by a dash, followed by three digits, followed by a dash, followed by three digits, followed by a dash, followed by four digits.

As another example, a user interface element may be configured to display a date. An acceptable display format for the user interface element may be: (a) two digits, followed by a dash, followed by two digits, followed by a dash, followed by four digits. The acceptable display format may further specify the first set of two digits must constitute a number between "01" and "12." The acceptable display format may further specify the second set of two digits must constitute a number between "01" and "31."

In one or more embodiments, a mask value 236 is a defined set of characters that serves to conceal another value, such as a token. A mask value 236 may be specified to be a set of characters that is known to be properly displayed by an interface. A mask value 236 for a particular token is not unique to the particular token. A same mask value 236 may be used for multiple different tokens. As an example, a token value may be, "bs23dfw5erc." Another token value may be, "235sdb457wec2." A mask value for both tokens may be the same, "****". As another example, a set of tokens may be replacements for various sets of restricted data, each of which indicates a different date. A mask value for the set of tokens may be a fixed date, such as "01/01/1900."

In an embodiment, different mask values 236 are used to replace tokens associated with different attributes. As an example, different mask values may be used to replace tokens associated with different data types. A mask value "****" may be used to replace tokens associated with a textual data type. Another mask value "0000" may be used to replace tokens associated with a numeric data type. Another mask value "1/1/1900" may be used to replace tokens associated with a date data type. As another example, different mask values may be used to replace tokens associated with different authorized jurisdictions.

In an embodiment, a mask value 236 for replacing tokens associated with a particular data type includes an end value of a particular set of values that may be assumed by data of the particular data type. As an example, a token may be associated with a numeric data type. The set of values that may be assumed by data of the numeric data type may be 0, 1, 2, 3, 4, 5, 6, 7, 8, or 9. An end value of the set of values that may be assumed by the data of the numeric data type may be "0" and/or "9." A mask value, for tokens associated with a numeric data type, may be "999999." As another example, a token may be associated with a textual data type. The set of values that may be assumed by data of the textual data type may range from "a" to "z." A mask value, for tokens associated with a textual data type, may be "azazaz."

In an embodiment, a length and/or format of a mask value 236, used for replacing a particular token, is determined based on a length and/or format of the original value of restricted data corresponding to the particular token. As an example, a set of restricted data may be a telephone number. A telephone number may include ten digits. The ten digits may be arranged as three digits, followed by a space (or dash), followed by three digits, followed by a space (or dash), followed by four digits. The telephone number may be, "415-326-2654." A particular token may be used for replacing the set of restricted data. A length of a mask value, for replacing the particular token, may be determined based on a length of the restricted data, which is ten digits. A format of the mask value may be determined based on a format of the restricted data. Hence, the mask value may include ten digits. The ten digits of the mask value may be arranged as three digits, followed by a space (or dash), followed by three digits, followed by a space (or dash), followed by four digits. The mask value may be, "000-000-0000."

Figure 3A:
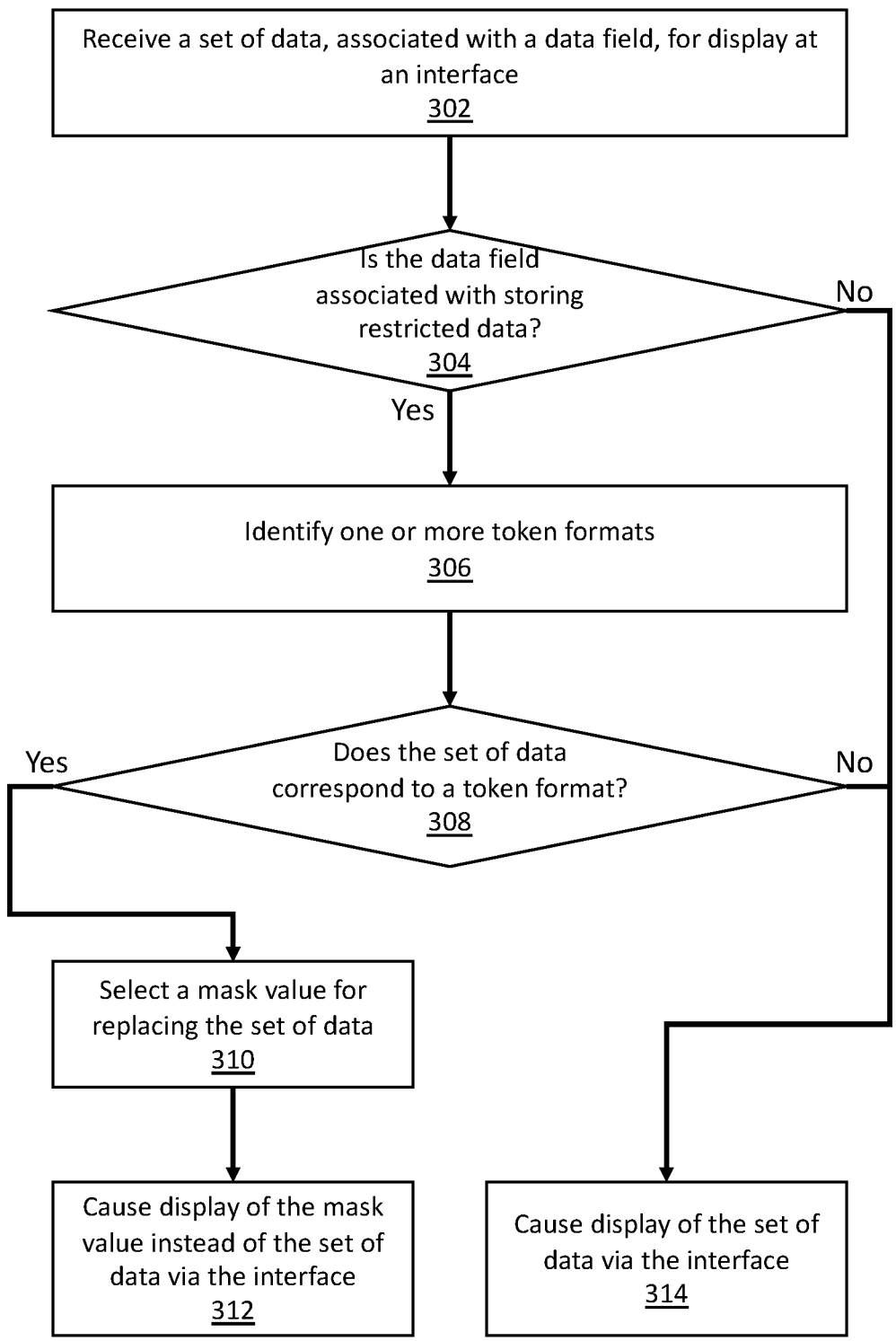
FIGS. 3A-B illustrate example sets of operations, performed by a masking engine that is not implemented by a cloud application, for replacing a token with a mask value for display at an interface, in accordance with one or more embodiments.
Figure 3B:
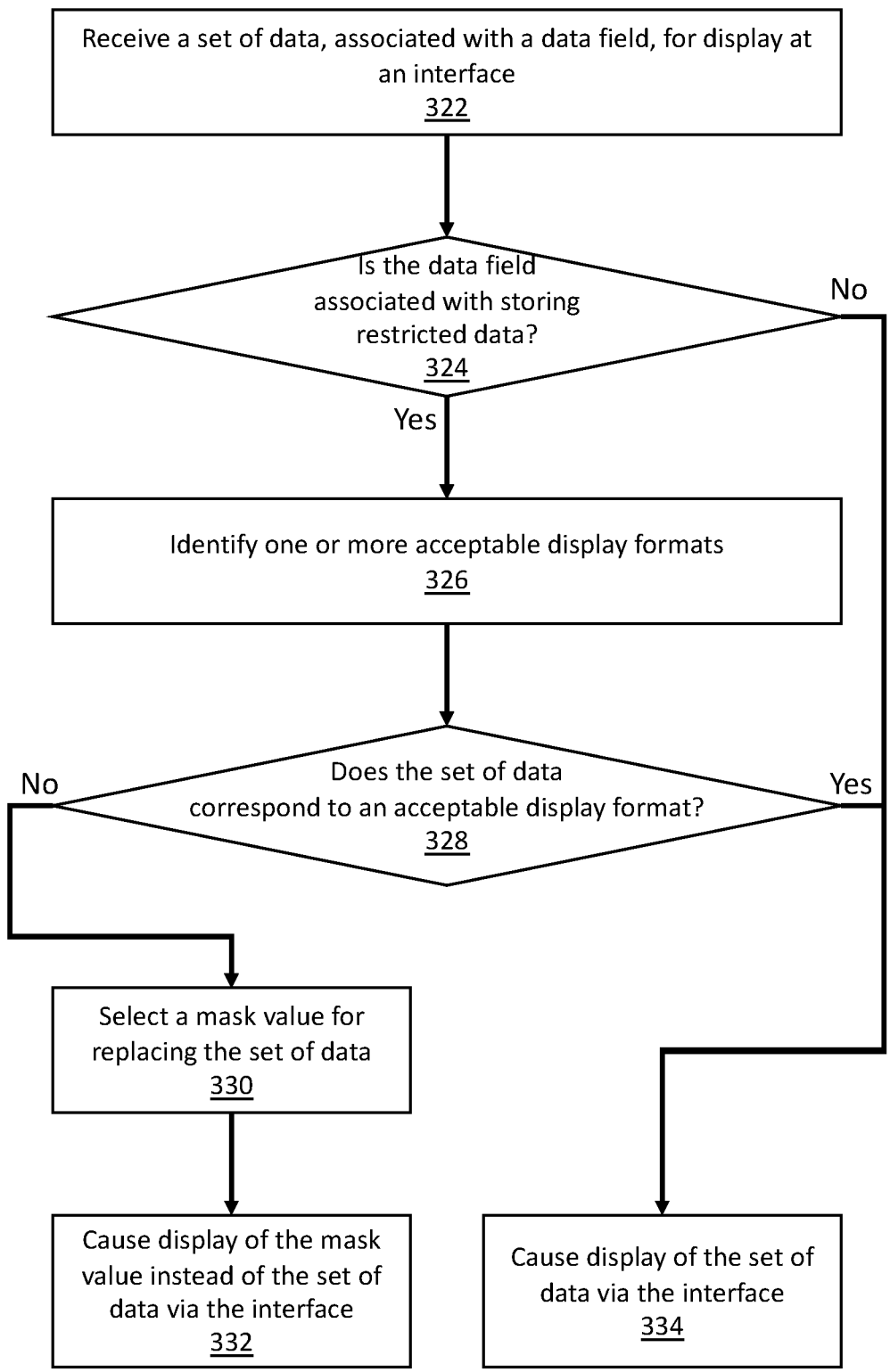
Figure 4A:
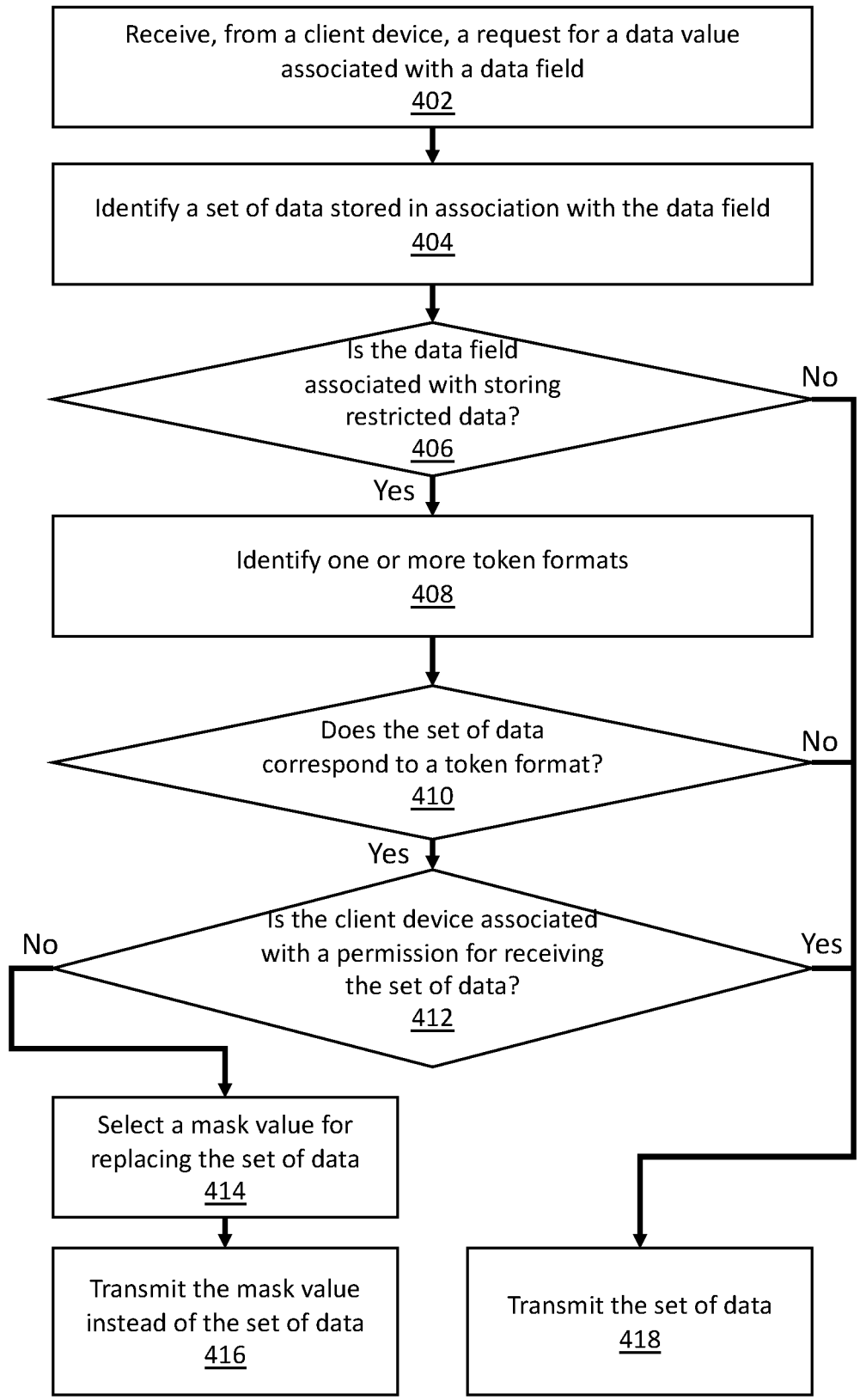
FIGS. 4A-B illustrates example sets of operations, performed by a masking engine that is implemented by a cloud application, for replacing a token with a mask value for display at an interface, in accordance with one or more embodiments.
Figure 4B:
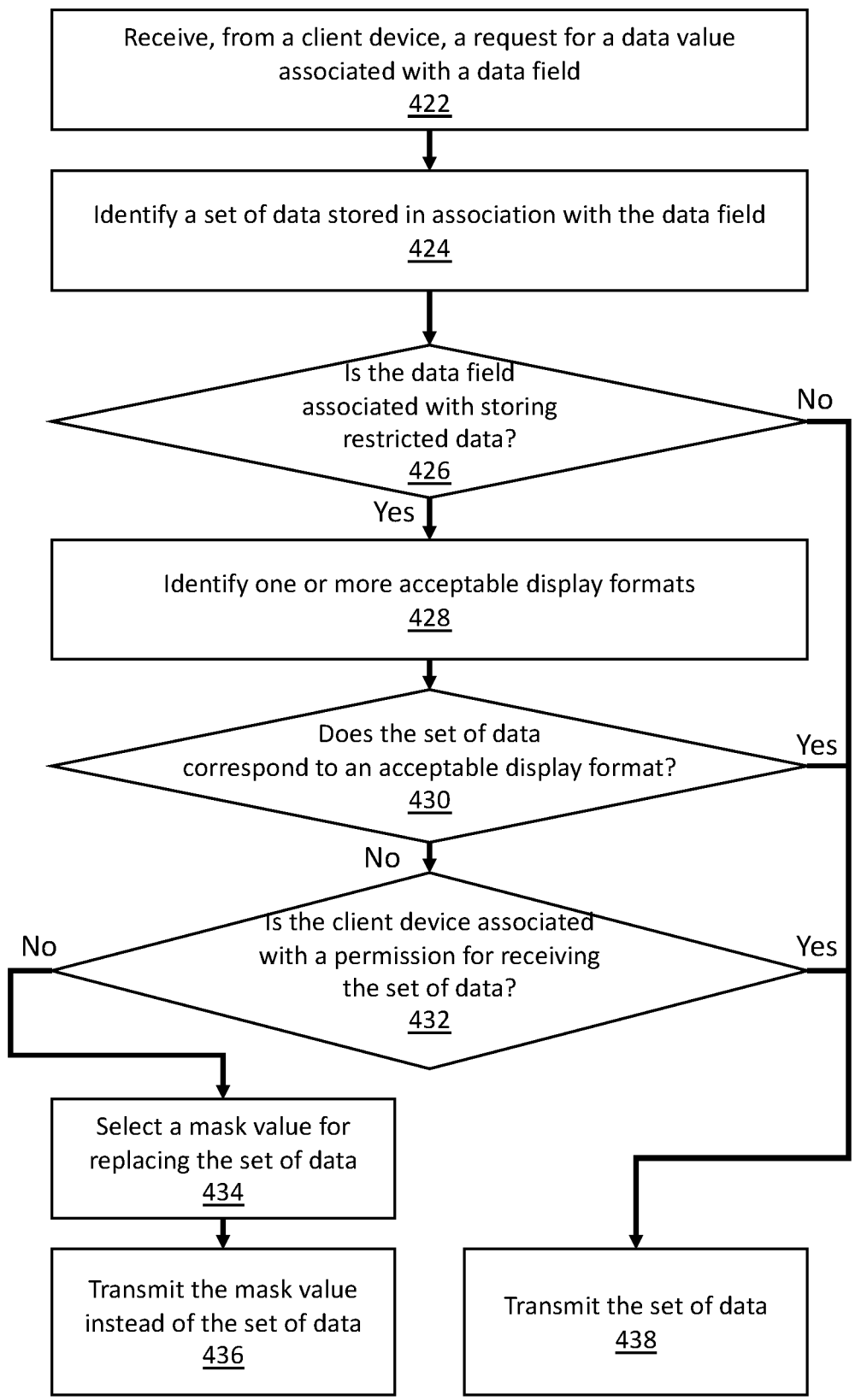

In one or more embodiments, a masking engine 112 refers to hardware and/or software configured to perform operations described herein for replacing a token with a mask value for display at an interface. In an embodiment, a masking engine 112 is implemented by a cloud application 114 that stores and/or processes tokens. FIGS. 4A-B illustrate example sets of operations, performed by a masking engine 112 that is implemented by a cloud application 114, for replacing a token with a mask value for display at an interface, in accordance with one or more embodiments. In another embodiment, a masking engine 112 is not implemented by the cloud application 114. The masking engine 112 may be implemented by a client device 116, by a DRP that serves as an intermediary between the client device 116 and the cloud application 114, and/or another component. Alternatively, the masking engine 112 may be implemented as a stand-alone device and/or component. FIGS. 3A-B illustrate example sets of operations, performed by a masking engine 112 that is not implemented by a cloud application 114, for replacing a token with a mask value for display at an interface, in accordance with one or more embodiments.

In an embodiment, a masking engine 112 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

3. Replacing a Token with a Mask Value by a Masking Engine that is not Implemented by a Cloud Application FIGS. 3A-B illustrate example sets of operations, performed by a masking engine that is not implemented by a cloud application, for replacing a token with a mask value for display at an interface, in accordance with one or more embodiments. The masking engine 112 may be implemented by a retrieving client device, by a DRP that serves as an intermediary between the retrieving client device and the cloud application 114, and/or another component. Alternatively, the masking engine 112 may be implemented as a stand-alone device and/or component. One or more operations illustrated in FIGS. 3A-B may be modified, rearranged, or omitted all together. Accordingly, the particular sequence of operations illustrated in FIGS. 3A-B should not be construed as limiting the scope of one or more embodiments.

FIG. 3A illustrates an example set of operations for replacing a token with a mask value based on one or more token formats.

One or more embodiments include receiving a set of data, associated with a data field, for display at an interface (Operation 302). A masking engine 112 receives the set of data directly and/or indirectly from a cloud application 114. The cloud application 114 transmitted the set of data in response to a request from a retrieving client device that is outside of an authorized jurisdiction for receiving restricted data. The masking engine 112 may receive the set of data using various methods, depending on how the masking engine 112 is implemented.

In an embodiment, the masking engine 112 is implemented by a DRP. The DRP intercepts the transmission of the set of data from the cloud application 114 to the retrieving client device. The DRP identifies a token within the set of data. The DRP determines that the retrieving client device is not within an authorized jurisdiction for receiving restricted data corresponding to the token. The DRP does not map the token to the original value of the restricted data. The DRP transmits the set of data (including the token) to the masking engine 112 executing on the DRP. Hence, the masking engine 112 receives the set of data.

In an embodiment, the masking engine 112 is implemented by the retrieving client device. The retrieving client device may receive the set of data directly from the cloud application 114. Alternatively, a DRP may intercept the transmission of the set of data from the cloud application 114 to the retrieving client device. The retrieving client device may receive the set of data from the DRP. Hence, the masking engine 112, executing on the retrieving client device, receives the set of data.

The masking engine 112 identifies a data field associated with the set of data. The set of data itself may identify the data field. As an example, a set of data may be organized according to a set of attribute-value pairs. The set of data may conform to, for example, a JavaScript Object Notation (JSON). The set of data may include: "First Name": "David", "Last Name": "Kim". Based on the set of data, a masking engine may determine that the data "David" is associated with the "First Name" data field. The masking engine may determine that the data "Kim" is associated with the "Last Name" data field.

Additionally or alternatively, the masking engine 112 determines a data field associated with the set of data based on the content, context, and/or semantics associated with the set of data. As an example, a "Social Security Number" data field may be associated with a particular format. Specifically, data within the "Social Security Number" data field may be a series of nine digits. The nine digits may be spaced as follows: three digits, followed by one space (or dash), followed by two digits, followed by one space (or dash), followed by four digits. A masking engine may analyze a set of data to determine whether the set of data conforms to the particular format. Responsive to finding that the set of data includes a series of nine digits, spaced as described above, then the masking engine may determine that the set of data is associated with the "Social Security Number" data field. As another example, a "State" data field may be associated with a limited set of possible data values. Specifically, since there are fifty states in the United States, the "State" data field may be populated only by one of fifty possible data values. A masking engine may analyze a set of data to determine whether the set of data matches any of the fifty possible data values. Responsive to finding a match, then the masking engine may determine that the set of data is associated with the "State" data field.

Additionally or alternatively, the masking engine 112 determines a data field associated with the set of data based on the request for the set of data. The request, from the retrieving client device, is a request for a data value associated with a particular data field. As an example, a request may be "Get the data value associated with a 'Name' data field." The particular data field specified in the request is the data field associated with the set of data.

One or more embodiments include determining whether the data field is associated with storing restricted data (Operation 304). The masking engine 112 determines whether the data field is associated with storing restricted data based on the set of data itself. The set of data may be associated with a flag and/or indicator. The flag and/or indicator may specify that the data field associated with the set of data is configured for storing restricted data. The flag and/or indicator may indicate that the set of data includes restricted data.

Additionally or alternatively, the masking engine 112 determines whether the data field is associated with storing restricted data based on the interface for displaying the set of data. The interface may specify that a particular user interface element is configured to display the set of data. The interface may specify that the particular user interface element is associated with displaying restricted data. As an example, a set of data may include: "First Name": "David", "Last Name": "Kim". An interface may specify that a particular textbox on the top-left of a page is configured to display data within the "First Name" data field. The interface may specify that a particular textbox on the top-right of the page is configured to display data within the "Last Name" data field. The interface may further specify that both the top-left textbox and the top-right textbox are associated with displaying restricted data. Based on the interface, a masking engine may determine that the "First Name" and "Last Name" data fields are associated with storing restricted data.

Additionally or alternatively, the masking engine 112 determines whether the data field is associated with storing restricted data based on a database and/or other source. The database includes a list of data fields configured for storing restricted data. The database may be generated by the laws and/or policies enacted by a particular authorized jurisdiction. The masking engine 112 compares (a) the data field associated with the set of data and (b) the list of data fields included in the database. If the data field associated with the set of data is included in the database, then the masking engine 112 determines that the data field associated with the set of data is configured for storing restricted data.

If the data field is not associated with storing restricted data, then the masking engine 112 causes display of the set of data via the interface (Operation 314). Since the set of data is not associated with restricted data, the set of data does not include any tokens. The set of data may be displayed at the interface.

One or more embodiments include identifying one or more token formats (Operation 306). The masking engine 112 retrieves the token formats from a data repository. As described above with reference to FIG. 2, a token format is a particular arrangement, structure, layout, style, form, shape, and/or size of the characters of a token.

In an embodiment, different token formats are used for tokens associated with different attributes. The masking engine 112 determines a particular attribute associated with the set of data received at Operation 302. Any tokens included in the set of data share the particular attribute associated with the set of data. The masking engine 112 identifies token formats used for tokens associated with the particular attribute. The masking engine 112 does not identify token formats used for tokens associated with other attributes.

As an example, a token format used for tokens associated with Canada may require that tokens begin with "Ca." A token format used for tokens associated with Europe may require that tokens begin with "Eu."

An originating client device, located in Canada, may generate a set of restricted data. The originating client device may transmit the restricted data to a cloud application for processing. A DRP may intercept the transmission and replace the restricted data with a token. The cloud application may process the token rather than the restricted data. A retrieving client device, outside of Canada, may request the restricted data from the cloud application. In response to the request, the cloud application may transmit a set of data, including the token, to the retrieving client device. A masking engine may receive the set of data. The masking engine may determine that an attribute associated with the set of data is that the set of data was generated in Canada. Hence, any tokens included in the set of data may be associated with Canada. The masking engine may identify one or more token formats used for tokens associated with Canada. The masking engine may identify the token format requiring tokens to begin with "Ca." The masking engine does not identify the token format requiring tokens to begin with "Eu."

One or more embodiments include determining whether the set of data corresponds to a token format (Operation 308). The masking engine 112 analyzes the set of data to determine whether the set of data complies with any of the token formats identified at Operation 306. The masking engine 112 identifies any data corresponding to a token format as a token.

As an example, a token format may require tokens to include characters of a foreign language (such as Chinese or Japanese). A masking engine may analyze a set of data to determine whether the set of data includes any characters of a foreign language. If the set of data includes characters of a foreign language, then the masking engine may determine that the set of data corresponds to the token format.

As another example, a token format may require tokens to include a minimum number of consecutive characters (with no intervening spaces). A masking engine may analyze a set of data to determine whether the set of data includes the minimum number of consecutive characters. If the set of data includes the minimum number of consecutive characters, then the masking engine may determine that the set of data corresponds to the token format.

As another example, a token format may require that tokens include a particular prefix. A masking engine may analyze a set of data to determine whether the set of data includes the particular prefix. If the set of data includes the particular prefix, then the masking engine may determine that the set of data corresponds to the token format.

If the set of data does not correspond to a token format, then the masking engine 112 causes display of the set of data via the interface (Operation 314). The masking engine 112 determines that the set of data does not include any tokens. Since the set of data does not include any tokens, the set of data may be displayed at the interface.

One or more embodiments include selecting a mask value for replacing the set of data (Operation 310). In an embodiment, a single mask value is used for all tokens. The masking engine 112 retrieves the mask value from a data repository. The masking engine 112 replaces the set of data with the mask value.

In an embodiment, different mask values are used for tokens associated with different attributes. The masking engine 112 determines a particular attribute associated with the token included in the set of data received at Operation 302. The masking engine 112 determines the particular attribute associated with the token based on a token format used for the token. Additionally or alternatively, the masking engine 112 determines the particular attribute associated with the token based on the data field associated with the set of data. The masking engine 112 selects a particular mask value used for tokens associated with the particular attribute.

As an example, a token format may require that tokens associated with a textual data type begin with "TXT." A mask value used for tokens associated with a textual data type may be "xxx." Another token format may require that tokens associated with a numeric data type begin with "NUM." A mask value used for tokens associated with a numeric data type may be "999." A masking engine may analyze a token included in a set of data. The masking engine may determine that the token begins with "TXT." The masking engine may determine that the token is associated with a textual data type. The masking engine may select the mask value "xxx" for replacing the token. The masking engine does not select the mask value "999" for replacing the token.

In an embodiment, a length and/or format of a mask value, used for replacing a particular token, is determined based on a length and/or format of the original value of restricted data corresponding to the particular token. The masking engine 112 determines a length and/or format of the original value of restricted data corresponding to the token included in the set of data received at Operation 302. The masking engine 112 may determine the length and/or format of the original value of restricted data using various methods, as further described below.

The masking engine 112 may determine the length and/or format of the original value of restricted data based on the data field associated with the set of data. As an example, a set of data may include a token replacing a particular set of restricted data. A data field associated with the set of data may be "Date." A masking engine may determine a format of data associated with a "Date" data field. Data populating a "Date" data field may include two digits, followed by a dash, followed by two digits, followed by a dash, followed by four digits. Data populating a "Date" data field may be, for example, "12/23/2015." Based on the "Date" data field, the masking engine may determine that the format of the particular set of restricted data is: two digits, followed by a dash, followed by two digits, followed by a dash, followed by four digits.

The masking engine 112 may determine the length and/or format of the original value of restricted data based on the data type associated with the token. As an example, a token, replacing a particular set of restricted data, may be associated with the data type, "Telephone Number." The format for telephone numbers may include: three digits, followed by a space (or dash), followed by three digits, followed by a space (or dash), followed by four digits. Based on the "Telephone Number" data type, a masking engine may determine that a format of the particular set of restricted data is: three digits, followed by a space (or dash), followed by three digits, followed by a space (or dash), followed by four digits.

The masking engine 112 may determine that a length and/or format of a mask value, used for replacing a particular token, is the same as a length and/or format of the original value of restricted data corresponding to the particular token. Additionally or alternatively, the masking engine 112 may determine a length and/or format of a mask value, used for replacing a particular token, as a function of a length and/or format of the original value of restricted data corresponding to the particular token.

One or more embodiments include causing display of the mask value instead of the set of data via the interface (Operation 312). The masking engine 112 replaces the set of data with the mask value selected at Operation 310.

In an embodiment, the masking engine 112 is implemented by the DRP. The DRP (and/or the masking engine 112 executing on the DRP) transmits the mask value to the retrieving client device. The retrieving client device receives the mask value. The retrieving client device displays the mask value, rather than the set of data, at the interface.

In an embodiment, the masking engine 112 is implemented by the retrieving client device. The retrieving client device displays the mask value, rather than the set of data, at the interface.

As described above, the mask value may be specified to be a set of characters that is known to be properly displayed by an interface. The mask value is properly displayed at the interface, without generating any distortions and/or errors. Conversely, if the client device attempted to display the set of data at the interface, the token included in the set of data would cause distortions and/or errors.

In one or more embodiments, the retrieving client device receives both the mask value and the token. The retrieving client device displays the mask value, rather than the token, at the interface. However, a user may still be able to access the token. As an example, the token may be shown in a tooltip or a comment that is displayed at the interface when the user performs a mouse-over over a user interface element displaying the mask value. As another example, a widget may be added to the interface as a footer or a sidebar. The widget may show a list of tokens hidden by mask values in the interface. As another example, hidden code within the interface may be used to display the token. As another example, comments in the source code of the interface may be used to store the token.

In one or more embodiments, the user interface element used to display the mask value is configured as a read-only field. The user interface element displays the mask value without functionality for accepting user input.

FIG. 3B illustrates an example set of operations for replacing a token with a mask value based on one or more acceptable display formats.

One or more embodiments include receiving a set of data, associated with a data field, for display at an interface (Operation 322). Descriptions relating to receiving a set of data for display at an interface are included above with reference to Operation 302.

One or more embodiments include determining whether the data field is associated with storing restricted data (Operation 324). Descriptions relating to determining whether the data field is associated with storing restricted data are included above with reference to Operation 304.

If the data field is not associated with storing restricted data, then the masking engine 112 causes display of the set of data via the interface (Operation 334). Descriptions relating to causing display of the set of data are included above with reference to Operation 314.

One or more embodiments include identifying one or more acceptable display formats (Operation 326). The masking engine 112 retrieves the acceptable display formats from a data repository. As described above with reference to FIG. 2, an acceptable display format is a format of data that may be properly displayed by an interface. Additionally or alternatively, an acceptable display format is a format of data that may be properly displayed by a particular user interface element of an interface.

One or more embodiments include determining whether the set of data corresponds to an acceptable display format (Operation 328). The masking engine 112 analyzes the set of data to determine whether the set of data complies with any of the acceptable display formats identified at Operation 326. The masking engine 112 determines any data that does not correspond to an acceptable display format as a token.

Descriptions relating to comparing a set of data with a particular format are included above with reference to Operation 308.

If the set of data corresponds to an acceptable display format, then the masking engine 112 causes display of the set of data via the interface (Operation 334). Descriptions relating to causing display of the set of data are included above with reference to Operation 314.

One or more embodiments include selecting a mask value for replacing the set of data (Operation 330). Descriptions relating to selecting a mask value for replacing the set of data are included above with reference to Operation 310.

One or more embodiments include causing display of the mask value instead of the set of data via the interface (Operation 332). Descriptions relating to causing display of the mask value instead of the set of data are included above with reference to Operation 312.

4. Replacing a Token with a Mask Value by a Masking Engine that is Implemented by a Cloud Application FIGS. 4A-B illustrates example sets of operations, performed by a masking engine that is implemented by a cloud application, for replacing a token with a mask value for display at an interface, in accordance with one or more embodiments. One or more operations illustrated in FIGS. 4A-B may be modified, rearranged, or omitted all together. Accordingly, the particular sequence of operations illustrated in FIGS. 4A-B should not be construed as limiting the scope of one or more embodiments.

FIG. 4A illustrates an example set of operations for replacing a token with a mask value based on one or more token formats.

One or more embodiments include receiving, from a retrieving client device, a request for a data value associated with a data field (Operation 402). A cloud application 114 receives, from the retrieving client device, the request for the data value associated with the data field. The cloud application 114 may receive the request over a network, such as the Internet. The cloud application 114 is not within an authorized jurisdiction for receiving restricted data. The cloud application 114 stores and/or processes tokens, which serve as temporary replacement values for the restricted data. A masking engine 112, implemented by the cloud application 114, receives the request. An example of a request may be, "Get the data value under the 'Birthday' data field." Another example of a request may be, "Get the data value under the user profile of the user 'John Smith.'" The user profile may include multiple data fields, such as a "Name" data field and a "Birthday" data field.

One or more embodiments include identifying a set of data stored in association with the data field (Operation 404). The cloud application 114 (and/or the masking engine 112) retrieves the set of data stored under the data field. The set of data may include one or more tokens that correspond to restricted data.

One or more embodiments include determining whether the data field is associated with storing restricted data (Operation 406). Descriptions relating to determining whether the data field is associated with storing restricted data are included above with reference to Operation 304.

If the data field is not associated with storing restricted data, then the masking engine 112 transmits the set of data (Operation 418). Since the data field is not associated with storing restricted data, the set of data does not include any tokens. Since the set of data does not include any tokens, the set of data may be transmitted. The cloud application 114 (and/or the masking engine 112 executing on the cloud application 114) transmits the set of data to the retrieving client device. The transmission of the set of data from the cloud application 114 to the retrieving client device may but is not necessarily intercepted by a DRP. If a DRP intercepted the transmission, the DRP would not perform any operations for mapping tokens to original values of restricted data since no tokens are included in the set of data.

One or more embodiments include identifying one or more token formats (Operation 408). Descriptions relating to identifying token formats are included above with reference to Operation 306.

One or more embodiments include determining whether the set of data corresponds to a token format (Operation 410). Descriptions relating to determining whether the set of data corresponds to a token format are included above with reference to Operation 308.

If the set of data does not correspond to a token format, then the masking engine 112 transmits the set of data (Operation 418). The masking engine 112 determines that the set of data does not include any tokens. Since the set of data does not include any tokens, the set of data may be transmitted. The cloud application 114 (and/or the masking engine 112 executing on the cloud application 114) transmits the set of data to the retrieving client device. The transmission of the set of data from the cloud application 114 to the retrieving client device may but is not necessarily intercepted by a DRP. If a DRP intercepted the transmission, the DRP would not perform any operations for mapping tokens to original values of restricted data since no tokens are included in the set of data.

One or more embodiments include determining whether the retrieving client device is associated with a permission for receiving the set of data (Operation 412). Whether the retrieving client device is associated with a permission for receiving the set of data may be determined based on various methods, as further described below.

In an embodiment, whether the retrieving client device is associated with a permission for receiving the set of data is determined based on (a) a jurisdiction associated with the retrieving client device (which requests the set of data from the cloud application 114), and (b) a jurisdiction associated with the originating client device (which transmitted the set of data to the cloud application 114).

The masking engine 112 determines the jurisdiction of the retrieving client device based on an Internet Protocol (IP) address associated with the request. The Internet Assigned Numbers Authority (IANA) and/or a regional Internet registry (RIR) assigns certain IP addresses to certain geographical regions, Internet service providers (ISPs), organizations, and/or entities. The IANA and/or RIR maintains one or more IP address assignment indexes to indicate which IP addresses have been assigned to which geographical regions, ISPs, organizations, and/or entities. The masking engine 112 looks up the IP address assignment indexes using the IP address associated with the request. Based on the look up, the masking engine 112 identifies the geographical region, ISP, organization, and/or entity assigned to the IP address associated with the request. The identified geographical region, ISP, organization, and/or entity is the jurisdiction associated with the retrieving client device.

As an example, a masking engine may determine that a request from a retrieving client device is associated with the IP address, 198.217.64.130. The masking engine may look up an IP address assignment index that indicates the IP address, 198.217.64.130, is assigned to California, United States of America. The masking engine may determine that a jurisdiction associated with the retrieving client device is California, United States of America.

Additionally or alternatively, the masking engine 112 determines the jurisdiction of the retrieving client device based on an indicator included in the request itself. A set of mappings between indicators and jurisdictions are stored at a data repository. The masking engine 112 identifies an indicator included in the request. The masking engine 112 maps the indicator to a particular jurisdiction. The masking engine 112 determines that the retrieving client device is associated with the particular jurisdiction.

As an example, a retrieving client device may request a set of data from a cloud application. The set of data may include a particular indicator, "34526." A masking engine may identify the indicator, "34526," included in the request. The masking engine may retrieve a set of mappings between indicators and jurisdictions from a data repository. Based on the set of mappings, the masking engine may determine that the particular indicator corresponds to Tarmart Corporation. The masking engine may determine that the retrieving client device is associated with Tarmart Corporation.

The cloud application 114 determines the jurisdiction of the originating client device at the time the cloud application 114 receives the set of data (and/or a token that serves as a temporary replacement value for the set of data). The cloud application 114 determines the jurisdiction of the originating client device based on an IP address associated with the transmission of the set of data, as described above. Additionally or alternatively, the cloud application 114 determines the jurisdiction of the originating client device based on an indicator and/or other information included in the transmission of the set of data, as described above. The cloud application 114 stores information indicating the jurisdiction of the originating client device along with the set of data in a depository. Additionally or alternatively, the cloud application 114 stores information indicating the jurisdiction of the originating client device in a database, table, and/or other memory structure separate from the set of data.

In response to a request for the set of data from the retrieving client device, the masking engine 112 retrieves the information indicating the jurisdiction of the originating client device from a data repository.

Subsequent to determining the jurisdiction associated with the retrieving client device and the jurisdiction associated with the originating client device, the masking engine 112 determines whether there is a match between the two jurisdictions.

A match between the two jurisdiction is found if the two jurisdictions are the same. Additionally or alternatively, a match between the two jurisdictions is found if the two jurisdictions are associated with each other. As an example, the laws of Germany may provide that a retrieving client device within any European country has permission to access restricted data generated in Germany. Based on these laws, Germany may be associated with multiple locations, including, for example, France and Spain. A retrieving client device, located in France, may request a set of restricted data generated in Germany. A masking engine may determine that the originating client device is associated with Germany, and the retrieving client device is associated with France. The masking engine may determine that Germany is associated with France. Based on the association, the masking engine may determine that there is a match between the jurisdiction of the retrieving client device and the jurisdiction of the originating client device.

If there is a match between the jurisdiction of the retrieving client device and the jurisdiction of the originating client device, then the masking engine 112 determines that the retrieving client device is associated with a permission for receiving the set of data. If a match is not found, then the retrieving client device is not associated with a permission for receiving the set of data.

In an embodiment, whether the retrieving client device is associated with a permission for receiving the set of data is determined based on a key, included in the request, indicating whether the permission is present. The key is used for accessing the original value of restricted data from a DRP. Specifically, prior to mapping a token to an original value of the restricted data, the DRP determines whether the request for the restricted data includes a key. The DRP may apply a cryptography and/or decryption algorithm to determine whether the key is valid. The DRP transmits the original value of the restricted data to the retrieving client device only if the request includes a valid key.

The cloud application 114 receives the request for the set of data, as described above at Operation 404. The masking engine 112, implemented by the cloud application 114, determines whether a key is included in the request. The masking engine 112 may apply a cryptography and/or decryption algorithm to determine whether the key is valid. If a valid key is found, then the masking engine 112 determines that the retrieving client device is associated with a permission for receiving the set of data. If a valid key is not found, then the retrieving client device is not associated with a permission for receiving the set of data.

In an embodiment, whether the retrieving client device is associated with a permission for receiving the set of data is determined based on a set of rules specifying criteria for determining whether the permission is present.

As an example, a rule may indicate that a retrieving client device has permission to access restricted data if there is a match between (a) a location of the retrieving client device, and (b) a location of the DRP that transmitted the token, in place of the restricted data, to the cloud application. A masking engine may determine a location of the DRP by querying the DRP. Additionally or alternatively, the masking engine may determine a location of the DRP by looking up a database of DRPs. Additionally or alternatively, the masking engine may determine a location of the DRP by analyzing the token itself. The token may include a tag indicating the location of the DRP. For example, a token including a flag "aaa" may indicate that the token was generated by a DRP in Berlin, Germany. A token including a flag "bbb" may indicate that the token was generated by a DRP in Hamburg, Germany.

If the retrieving client device is associated with a permission for receiving the set of data, then the masking engine 112 transmits the set of data (Operation 418). Since the retrieving client device is associated with the permission, any tokens included in the set of data may be transmitted to the retrieving client device. The cloud application 114 (and/or the masking engine 112 executing on the cloud application 114) transmits the set of data to the retrieving client device. A DRP intercepts the transmission and replaces any tokens, within the set of data, with the original values of restricted data. The DRP transmits the original values of restricted data to the retrieving client device.

One or more embodiments include selecting a mask value for replacing the set of data (Operation 414). Descriptions relating to selecting a mask value for replacing the set of data are included above with reference to Operation 310.

One or more embodiments include transmitting the mask value instead of the set of data (Operation 416). The cloud application 114 (and/or the masking engine 112 executing on the cloud application 114) transmits the mask value, instead of the set of data, to the retrieving client device. The retrieving client device displays the mask value, rather the set of data, at an interface. The transmission of the mask value from the cloud application 114 to the retrieving client device may but is not necessarily intercepted by a DRP. The DRP does not perform any mapping to original values of restricted data based on the mask value.

FIG. 4B illustrates an example set of operations for replacing a token with a mask value based on one or more acceptable display formats.

One or more embodiments include receiving, from a client device, a request for a data value associated with a data field (Operation 422). Descriptions relating to receiving the request for the set of data associated with the data field are included above with reference to Operation 402.

One or more embodiments include identifying a set of data stored in association with the data field (Operation 424). Descriptions relating to identifying a set of data stored in association with the data field are included above with reference to Operation 404.

One or more embodiments include determining whether the data field is associated with storing restricted data (Operation 426). Descriptions relating to determining whether the data field is associated with storing restricted data are included above with reference to Operation 304.

If the data field is not associated with storing restricted data, then the masking engine 112 transmits the set of data (Operation 438). Since the data field is not associated with storing restricted data, the set of data does not include any tokens. Since the set of data does not include any tokens, the set of data may be transmitted. The cloud application 114 (and/or the masking engine 112 executing on the cloud application 114) transmits the set of data to the retrieving client device. The transmission of the set of data from the cloud application 114 to the retrieving client device may but is not necessarily intercepted by a DRP. If a DRP intercepted the transmission, the DRP would not perform any operations for mapping tokens to original values of restricted data since no tokens are included in the set of data.

One or more embodiments include identifying one or more acceptable display formats (Operation 428). Descriptions relating to identifying token formats are included above with reference to Operation 326.

One or more embodiments include determining whether the set of data corresponds to an acceptable display format (Operation 430). Descriptions relating to determining whether the set of data corresponds to a token format are included above with reference to Operation 328.

If the set of data corresponds to an acceptable display format, then the masking engine 112 transmits the set of data (Operation 438). Since the set of data corresponds to an acceptable display format, the set of data may be transmitted. The cloud application 114 (and/or the masking engine 112 executing on the cloud application 114) transmits the set of data to the retrieving client device. The transmission of the set of data from the cloud application 114 to the retrieving client device may but is not necessarily intercepted by a DRP. If a DRP intercepted the transmission, the DRP would not perform any operations for mapping tokens to original values of restricted data since no tokens are included in the set of data.

One or more embodiments include determining whether the retrieving client device is associated with a permission for receiving the set of data (Operation 432). Descriptions relating to determining whether the retrieving client device is associated with a permission for receiving the set of data are included above with reference to Operation 412.

If the retrieving client device is associated with a permission for receiving the set of data, then the masking engine 112 transmits the set of data (Operation 438). Since the retrieving client device is associated with the permission, any tokens included in the set of data may be transmitted to the retrieving client device. The cloud application 114 (and/or the masking engine 112 executing on the cloud application 114) transmits the set of data to the retrieving client device. A DRP intercepts the transmission and replaces any tokens, within the set of data, with the original values of restricted data. The DRP transmits the original values of restricted data to the retrieving client device.

One or more embodiments include selecting a mask value for replacing the set of data (Operation 434). Descriptions relating to selecting a mask value for replacing the set of data are included above with reference to Operation 310.

One or more embodiments include transmitting the mask value instead of the set of data (Operation 436). The cloud application 114 (and/or the masking engine 112 executing on the cloud application 114) transmits the mask value, instead of the set of data, to the retrieving client device. The retrieving client device displays the mask value, rather the set of data, at an interface. The transmission of the mask value from the cloud application 114 to the retrieving client device may but is not necessarily intercepted by a DRP. The DRP does not perform any mapping to original values of restricted data based on the mask value.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5:
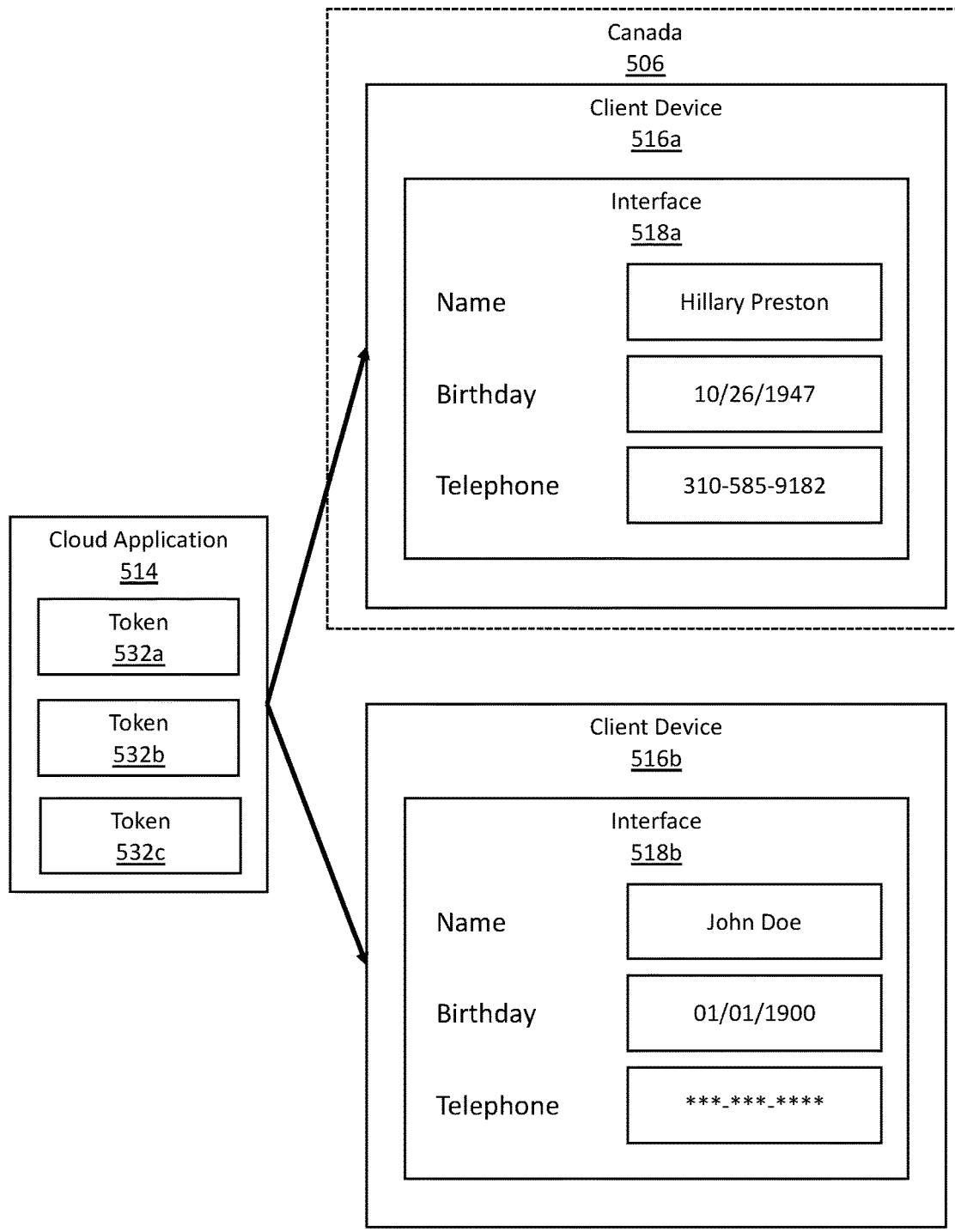
FIG. 5 illustrates an example for replacing a token with a mask value for a client device that is outside of an authorized jurisdiction, in accordance with one or more embodiments.

FIG. 5 illustrates an example for replacing a token with a mask value for a client device that is outside of an authorized jurisdiction, in accordance with one or more embodiments.

As illustrated, a cloud application 514 stores tokens 532a-c. The tokens 532a-c are temporary replacement values for restricted data transmitted from an originating client device located in Canada 506, which is an authorized jurisdiction. Token 532a is a temporary replacement value for "Hillary Preston," associated with a "Name" data field. Token 532b is a temporary replacement value for "10/26/1947," associated with a "Birthday" data field. Token 532c is a temporary replacement value for "310-585-9182," associated with a "Telephone" data field. Each of the tokens 532a-c include 400 consecutive characters (with no intervening spaces). Further, each of the tokens 532a-c include Japanese characters.

A client device 516a, associated with interface 518a, is located in Canada 506. Another client device 516b, associated with interface 518b, is located outside of Canada 506. Interfaces 518a-b are configured to display information in the English language.

The client device 516a requests data values associated with the "Name," "Birthday," and "Telephone" data fields from the cloud application 514. In response to the request, the cloud application 514 transmits the tokens 532a-c. A DRP intercepts the transmission from the cloud application 514 to the client device 516a. The DRP replaces the tokens 532a-c with the original values of the restricted data. Token 532a is replaced with "Hillary Preston." Token 532b is replaced with "10/26/1947." Token 532c is replaced with "310-585-9182." The DRP transmits the original values of the restricted data to the client device 516a. The client device 516a receives "Hillary Preston" for the "Name" data field, "10/26/1947" for the "Birthday" data field, and "310-585-9182" for the "Telephone" data field.

A masking engine is implemented by the client device 516a. The masking engine receives "Hillary Preston" for the "Name" data field, "10/26/1947" for the "Birthday" data field, and "310-585-9182" for the "Telephone" data field.

The masking engine determines whether the data fields are associated with storing restricted data. The masking engine analyzes the set of data received by the client device 516a. The set of data includes tags indicating that the "Name," "Birthday," and "Telephone" data fields are associated with storing restricted data. Based on the tags, the masking engine determines the data fields are associated with storing restricted data.

The masking engine retrieves token formats from a data repository. One token format indicates that tokens include (a) a minimum of 300 consecutive characters (with no intervening spaces), and (b) at least one character in a foreign language. Another token format indicates that tokens begin with a prefix "!!!".

The masking engine compares the set of data, received by the client device 516a, with the token formats. The masking engine determines that the set of data does not include a minimum of 300 consecutive characters. The masking engine determines that the set of data does not include any characters in a foreign language. The masking engine determines the set of data does not include any data beginning with a prefix "!!!". The masking engine determines that the set of data does not include any tokens.

The masking engine does not replace the set of data with any mask values. The masking engine causes the interface 518a to display the set of data. The interface 518a displays "Hillary Preston" in a user interface element labeled "Name", "10/26/1947" in a user interface element labeled "Birthday" data field, and "310-585-9182" in a user interface element labeled "Telephone."

The client device 516b requests data values associated with the "Name," "Birthday," and "Telephone" data fields from the cloud application 514. In response to the request, the cloud application 514 transmits the tokens 532a-c. However, since the client device 516b is outside of Canada, the DRP does not intercept the transmission from the cloud application 514 to the client device 516b. The client device 516b receives the tokens 532a-c.

A masking engine is implemented by the client device 516b. The masking engine receives the tokens 532a-c. The masking engine identifies the "Name," "Birthday," and "Telephone" data fields specified in the request from the client device 516b. The masking engine determines whether the data fields are associated with storing restricted data. The masking engine retrieves a list of data fields configured for storing restricted data from a database. The masking engine determines that the "Name," "Birthday," and "Telephone" data fields are included in the list. The masking engine determines that the "Name," "Birthday," and "Telephone" data fields are associated with storing restricted data.

The masking engine retrieves token formats from a data repository. As described above, one token format indicates that tokens include (a) a minimum of 300 consecutive characters (with no intervening spaces), and (b) at least one character in a foreign language.

The masking engine compares each of the tokens 532a-c with the token format. Since each of the tokens 532a-c includes (a) 400 consecutive characters and (b) Japanese characters, the masking engine determines that the tokens 532a-c correspond to the token format.

The masking engine selects a mask value for replacing each of the tokens 532a-c. The masking engine determines a data type of the token 532a. The masking engine determines that the token 532a is returned from the cloud application 514 based on the request for a data value stored under the "Name" data field. The masking engine determines that the token 532a is associated with a "Name" data type. The masking engine identifies a mask value associated with a "Name" data type." The mask value is "John Doe." The masking engine causes the interface 518b to display "John Doe," rather than the token 532a.

The masking engine determines that the token 532b is returned from the cloud application 514 based on the request for a data value stored under the "Birthday" data field. The masking engine determines that the token 532b is associated with a "Date" data type. The masking engine identifies a mask value associated with a "Date" data type." The mask value is "01/01/1900." The masking engine causes the interface 518b to display "01/01/1900," rather than the token 532b.

The masking engine determines that the token 532c is returned from the cloud application 514 based on the request for a data value stored under the "Telephone" data field. The masking engine determines that the token 532c is associated with a "Telephone" data type. The masking engine identifies a mask value associated with a "Telephone" data type." The mask value is "*-*-**." The masking engine causes the interface 518b to display "*-*-**," rather than the token 532c.

Interface 518b displays "John Doe" in a user interface element labeled "Name", "01/01/1900" in a user interface element labeled "Birthday" data field, and "*-*-****" in a user interface element labeled "Telephone."

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
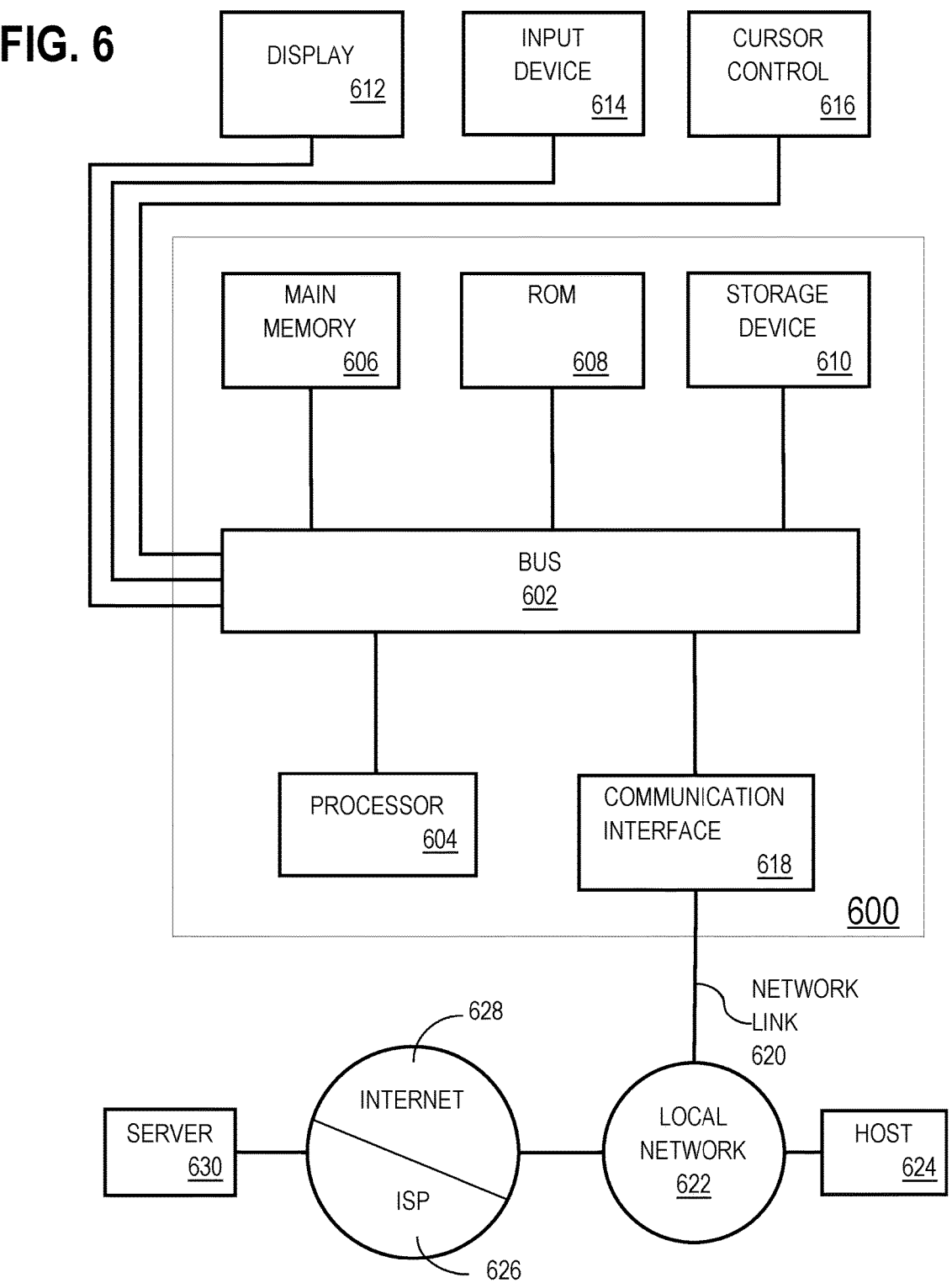
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   identifying a set of data comprising a first subset of data and a second subset of data;
      wherein a mask value is to be displayed, via an interface, in place of any subset of the set of data that comprises one or more tokens; and
      wherein any subset of the set of data that does not include any tokens is to be displayed without any mask value substitution;

detecting that the first subset of data does not comprise any token by determining that the first subset of data does not correspond to at least a first token format of a plurality of token formats;
responsive to detecting that the first subset of data does not comprise any token: causing display of the first subset of data via the interface, wherein the first subset of data was transmitted from an originating client device;
detecting that the second subset of data comprises a token by determining that the second subset of data corresponds to a second token format of the plurality of token formats, wherein the token (a) was generated by a device other than the originating client device to replace restricted data transmitted from the originating client device and (b) maps to the restricted data transmitted from the originating client device; and
responsive to detecting that the second subset of data comprises the token: causing display of a mask value, instead of the token, via the interface.

2. The medium of claim 1, wherein causing display of the mask value, instead of the second subset of data, via the interface comprises: displaying the mask value, instead of the second subset of data, via the interface.

3. The medium of claim 1, wherein causing display of the mask value, instead of the second subset of data, via the interface comprises: transmitting the mask value, instead of the second subset of data, toward a client device associated with the interface.

4. The medium of claim 1, wherein the operations further comprise:
prior to determining that the second subset of data corresponds to the second token format:
identifying a data field associated with the second subset of data;
determining that the data field is associated with storing restricted data.

5. The medium of claim 1, wherein the operations further comprise:
identifying a data field associated with the second subset of data;
selecting the second token format, from the plurality of token formats, based on the data field.

6. The medium of claim 1, wherein the operations further comprise:
prior to causing display of the mask value, instead of the second subset of data, via the interface:
identifying a data field associated with the second subset of data;
identifying the mask value based on the data field.

7. The medium of claim 1, wherein an attempt to display the second subset of data at the interface results in a distortion at the interface.

8. The medium of claim 1, wherein the token is mapped to the restricted data by a data residency proxy (DRP).

9. The medium of claim 1, wherein the set of data is received from an application, and the application received the set of data from a data residency proxy (DRP).

10. The medium of claim 1, wherein the operations further comprise:
identifying a particular jurisdiction in which the originating client device is located;
selecting the second token format, from the plurality of token formats, based on the particular jurisdiction.

11. The medium of claim 1, wherein the operations are performed by a second device located outside of an authorized jurisdiction for viewing the restricted data transmitted from the originating client device.

12. The medium of claim 1, wherein the operations further comprise:
receiving the set of data from a second device located outside of an authorized jurisdiction for viewing the restricted data transmitted from the originating client device.

13. The medium of claim 1, wherein the second token format requires a certain prefix.

14. The medium of claim 1, wherein the second token format requires including at least one foreign language character.

15. A system, comprising:
at least one device including a hardware processor; and
the system being configured to perform operations comprising:
identifying a set of data comprising a first subset of data and a second subset of data;
wherein a mask value is to be displayed, via an interface, in place of any subset of the set of data that comprises one or more tokens; and
wherein any subset of the set of data that does not include any tokens is to be displayed without any mask value substitution;
detecting that the first subset of data does not comprise any token by determining that the first subset of data does not correspond to at least a first token format of a plurality of token formats;
responsive to detecting that the first subset of data does not comprise any token: causing display of the first subset of data via the interface, wherein the first subset of data was transmitted from an originating client device;
detecting that the second subset of data comprises a token by determining that the second subset of data corresponds to a second token format of the plurality of token formats, wherein the token (a) was generated by a device other than the originating client device to replace restricted data transmitted from the originating client device and (b) maps to the restricted data transmitted from the originating client device; and
responsive to detecting that the second subset of data comprises the token:
causing display of a mask value, instead of the token, via the interface.

16. The system of claim 15, wherein causing display of the mask value, instead of the second subset of data, via the interface comprises:
displaying the mask value, instead of the second subset of data, via the interface.

17. The system of claim 15, wherein causing display of the mask value, instead of the second subset of data, via the interface comprises:
transmitting the mask value, instead of the second subset of data, toward a client device associated with the interface.

18. A method, comprising:
identifying a set of data comprising a first subset of data and a second subset of data;
wherein a mask value is to be displayed, via an interface, in place of any subset of the set of data that comprises one or more tokens; and
wherein any subset of the set of data that does not include any tokens is to be displayed without any mask value substitution;

detecting that the first subset of data does not comprise any token by determining that the first subset of data does not correspond to at least a first token format of a plurality of token formats;

responsive to detecting that the first subset of data does not comprise any token: causing display of the first subset of data via the interface, wherein the first subset of data was transmitted from an originating client device;

detecting that the second subset of data comprises a token by determining that the second subset of data corresponds to a second token format of the plurality of token formats, wherein the token (a) was generated by a device other than the originating client device to replace restricted data transmitted from the originating client device and (b) maps to the restricted data transmitted from the originating client device; and responsive to detecting that the second subset of data comprises the token:

causing display of a mask value, instead of the token, via the interface;

wherein the method is performed by at least one device including a hardware processor.

19. The method of claim 18, wherein causing display of the mask value, instead of the second subset of data, via the interface comprises:

displaying the mask value, instead of the second subset of data, via the interface.

20. The method of claim 18, wherein causing display of the mask value, instead of the second subset of data, via the interface comprises:

transmitting the mask value, instead of the second subset of data, toward a client device associated with the interface.

* * * * *